United States Patent
Lim et al.

(10) Patent No.: US 7,701,961 B2
(45) Date of Patent: Apr. 20, 2010

(54) METHOD AND APPARATUS FOR COMMON PACKET CHANNEL ACCESS IN MOBILE SATELLITE COMMUNICATION SYSTEM

(75) Inventors: Kwang-Jae Lim, Daejon (KR); Soo-Young Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1128 days.

(21) Appl. No.: 10/493,276

(22) PCT Filed: Oct. 21, 2002

(86) PCT No.: PCT/KR02/01972

§ 371 (c)(1), (2), (4) Date: Apr. 19, 2004

(87) PCT Pub. No.: WO03/036821

PCT Pub. Date: May 1, 2003

(65) Prior Publication Data

US 2004/0252655 A1    Dec. 16, 2004

(30) Foreign Application Priority Data

Oct. 20, 2001   (KR) ..................... 10-2001-0064917

(51) Int. Cl.
*H04L 12/413* (2006.01)
(52) U.S. Cl. .................. 370/445; 370/316; 455/427
(58) Field of Classification Search ........... None
See application file for complete search history.

(56) References Cited

U.S. PATENT DOCUMENTS 4,888,763 A    12/1989   Hatfield et al.

(Continued)

FOREIGN PATENT DOCUMENTS

EP          0765096 A2        3/1997

(Continued)

OTHER PUBLICATIONS

3GPP TS 25.211 V3.80 Sep. 1, 2001 Random Access Channel.

(Continued)

*Primary Examiner*—Phirin Sam
(74) *Attorney, Agent, or Firm*—Blakely, Sokoloff, Taylor & Zafman LLP

(57) ABSTRACT

Provided is a method and apparatus for common packet channel access to transmit data packet from a mobile terminal to a satellite access network in a mobile satellite communication system. The method and apparatus of this invention reduces transmission delay time, enhances the probability of successful access, and controls the currently used common packet channel by using a common control channel broadcast by the satellite access network. The method includes the steps of: receiving an access preamble including an access signature code and a collision-detection preamble including a collision-detection signature code, which are transmitted together from a plurality of mobile terminals, and transmitting an acknowledgement to the access preamble and collision-detection preamble to mobile terminals through a preamble acknowledgement channel.

59 Claims, 8 Drawing Sheets

U.S. PATENT DOCUMENTS

| | | | |
|---|---|---|---|
| 5,673,259 A | 9/1997 | Quick, Jr. | |
| 5,734,833 A | 3/1998 | Chiu et al. | |
| 5,822,359 A | 10/1998 | Bruckert et al. | |
| 5,828,662 A | 10/1998 | Jalali et al. | |
| 5,963,557 A | 10/1999 | Eng | |
| 6,317,585 B1* | 11/2001 | Shibasaki | 455/13.2 |
| 6,442,153 B1 | 8/2002 | Dahlman et al. | 370/342 |
| 6,480,525 B1* | 11/2002 | Parsa et al. | 375/141 |
| 6,597,675 B1* | 7/2003 | Esmailzadeh et al. | 370/335 |
| 6,643,318 B1* | 11/2003 | Parsa et al. | 375/141 |
| 6,665,282 B1* | 12/2003 | Eriksson et al. | 370/332 |
| 6,700,867 B2* | 3/2004 | Classon et al. | 370/216 |
| 6,757,319 B1* | 6/2004 | Parsa et al. | 375/141 |
| 6,831,910 B1* | 12/2004 | Moon et al. | 370/342 |
| 6,859,445 B1* | 2/2005 | Moon et al. | 370/335 |
| 7,046,717 B2* | 5/2006 | Kanterakis et al. | 375/141 |
| 7,058,038 B2* | 6/2006 | Yi et al. | 370/335 |
| 7,079,507 B2* | 7/2006 | Toskala et al. | 370/329 |
| 7,113,496 B2* | 9/2006 | Koo et al. | 370/335 |
| 7,233,577 B2* | 6/2007 | Choi et al. | 370/252 |
| 2001/0017881 A1* | 8/2001 | Bhatoolaul et al. | 375/130 |
| 2001/0038619 A1* | 11/2001 | Baker et al. | 370/335 |
| 2003/0103476 A1* | 6/2003 | Choi et al. | 370/329 |
| 2003/0174672 A1* | 9/2003 | Herrmann | 370/329 |
| 2006/0203753 A1* | 9/2006 | Toskala et al. | 370/278 |
| 2008/0062951 A1* | 3/2008 | Kanterakis et al. | 370/342 |

FOREIGN PATENT DOCUMENTS

| | | |
|---|---|---|
| JP | 4-108238 | 4/1992 |
| KR | 010084550 | 9/2001 |

OTHER PUBLICATIONS

Kamran Etemad et al.; "Enhanced Random Access and Reservation Scheme in CDMA2000"; IEEE Personal Communications; Apr. 2001; (pp. 30-36).

Richard D.J. van Nee et al.; "Slotted ALOHA and Code Division . . . Satellite PErsonal Communications"; IEEE Journal on Selected Areas in Comms. vol. 13, No. 2, 2/95.

3rd Generation Partnership Project (3GPP); "Technical Specification" (Sep. 2001).

CIC 2001 "The 6th CDMA Int'l Conf." Oct. 30-Nov. 2, 2001. (52 pp.).

"Universal Mobile Telecommunications System (UMTS); Physical layer procedures (FDD) (3GPP TS 25.214 version 4.2.0 Release 4); ETSI TS 125 214", ETSI Standards, LIS, Sophia Antipolis Cedex, France, vol. 3-RI, No. V4.2.0, Sep. 1, 2001, XP014008484 ISSN: 0000-0001; p. 29; figure 2, paragraph [06.1], paragraph [06.2], pp. 31-32.

"Universal Mobile Telecommunications System (UMTS); Physical channels and mapping of transport channels onto physical channels (FDD)(3GPP TS 25.211 version 4.2.0 Release 4); ETSI TS 125 211", ETSI Standards, LIS, Sophia Antipolis Cedes, France, vol. 3-RI, No. V4.2.0, Sep. 1, 2001, XP014008341, ISSN: 0000-0001; paragraph [5.3.3.9]; figure 32, paragraphs [5.2.2.1.2], [5.2.2.2], [5.3.3.7], [5.3.3.8] and [5.3.3.9].

"Universal Mobile Telecommunications System (UMTS); Spreading and modulation (FDD) (3GPP TS 25,213 version 4.1.0 Release 4); ETSI TS 125 213", ETSI Standards, LIS, Sophia Antipolis Cedes, France, Vol. 3-RI, No. V4.1.0, Jun. 1, 2001, XP014008384, ISSN: 0000-0001, whole document.

\* cited by examiner

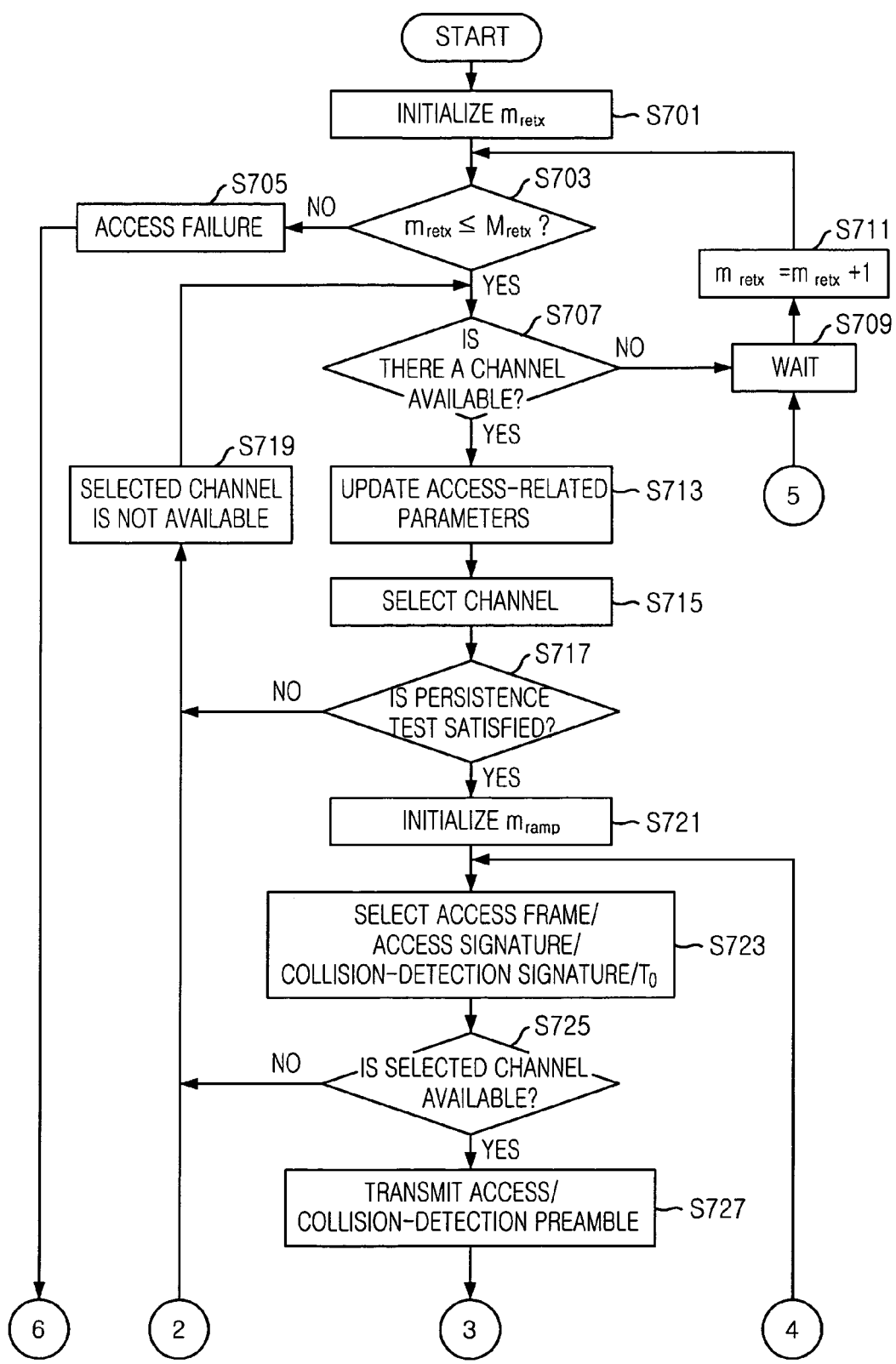

METHOD AND APPARATUS FOR COMMON PACKET CHANNEL ACCESS IN MOBILE SATELLITE COMMUNICATION SYSTEM

The present patent application is a non-provisional application of International Application No. PCT/KR02/01972, filed Oct. 21, 2002.

TECHNICAL FIELD

The present invention relates to a method and apparatus for common packet channel (CPCH) access for transmitting data packets having bursty traffic from a mobile terminal to a satellite access network in a code division multiple access (CDMA) mobile satellite communication system.

BACKGROUND ART

Common packet channel (CPCH) is a channel used for transmitting packet data which is too big to be transmitted through an uplink random access channel (RACH) and too small to be transmitted through an uplink dedicated channel, such as one for voice service. The CPCH is usually used for transmitting packet data of middle-length less than 50 frames.

The CPCH structure and CPCH access/control procedures are disclosed in the specification documents of 25.211 and 25.214, drawn by the Technical Specification Group (TS) of the $3^{rd}$ Generation Partnership Project (3GPP).

The CPCH is related to a downlink dedicated channel that provides power control and transmission control commands with respect to each CPCH. The CPCH is characterized by initial collision risk and inner loop power control.

In case where data is one to two-frame long, it is transmitted through uplink random access channel (RACH).

If a length of the data is 50 frames or more, such as voice data, it is transmitted through the uplink dedicated channel.

In a satellite mobile communication system for IMT-2000 service, a mobile terminal transmits an access preamble to the satellite access network through an access channel before transmitting a data packet, in order to obtain data transmit grant.

If the satellite access network acknowledges the acquisition of the access preamble, the mobile terminal transmits a collision-detection preamble additionally to avoid any collision.

If the satellite access network acknowledges the successful reception of the collision-detection preamble and sends an acknowledgement for channel assignment, the mobile terminal transmits the user data packet, which is the main packet, through an allowed uplink common packet channel.

The satellite access network performs transmission control, such as commanding transmission start, transmission stop, and power control with respect to each uplink packet channel, using a downlink dedicated channel corresponding to each uplink common packet channel.

Since the access preamble contains a signature which indicates a common packet channel (in case that a channel is not assigned, hereinafter, which is referred as "a channel unassignment mode") that the mobile terminal selects for packet transmission (in case of a channel unassignment mode), or (in case that a channel is assigned, hereinafter, which is referred as "a channel assignment mode") indicates a transmission rate, the satellite access network recognizes the request of the mobile terminal by detecting the signature in the access preamble.

The collision-detection preamble is used for avoiding the collision of the packets transmitted by two or more than mobile terminals at the same time.

Since the number of signatures used for the access preamble is restricted, two or more than mobile terminals may transmit their access preambles using the identical signature at the same time. Therefore, the collision-detection preamble is used for preventing different mobile terminals from using the same common packet channel, when the mobile terminals transmit access preambles using the same signature at the same time.

Although the mobile terminals transmit access preambles using the same signature, if a collision-detection preamble is transmitted using a signature selected by each mobile terminal independently again (the selected signature may or may not be the same as the signature of the access preamble), the satellite access network can discriminate collision-detection preambles and select any one of the collision-detection preambles. The satellite access network, then, transmits an acknowledgement corresponding to the selected collision-detection preamble in order to allow data transmission to a mobile terminal. The mobile terminal that receives the acknowledgement can obtain the grant for using the common packet channel and transmit data packets. Therefore, the collision between data packets transmitted by the different mobile terminals can be avoided.

However, there are some problems in applying the common packet channel access method used in the terrestrial system to the satellite system.

First, although the propagation delay is no more than one millisecond (ms) in a cell of the terrestrial system, the delay is more than tens of milliseconds in the satellite system, even in case of a low earth orbit (LEO) satellite system. Therefore, the access delay spent in the two processes of transmitting preambles for access and channel requests is relatively very long, compared with that of the terrestrial system.

Second, in the satellite system the probability of successful reception of the preamble is relatively low because of poor link characteristics, such as long distance and fading. Moreover, in case of using a low earth orbit (LEO) satellite system, Doppler shift occurs up to tens of Khz.

Third, in the terrestrial system, a downlink dedicated channel for controlling packet transmission and transmit power is assigned to each uplink packet channel, and in case where a plurality of packet channels are used, the terrestrial system should use the downlink dedicated control channels as many as the assigned packet channels. The transmit power of packet channels and control channels is controlled by each other using closed loop power control.

However, the ratio of transmission power loss between mobile terminals in the satellite system is relatively smaller than that in the terrestrial system. That is, in case of the satellite system, the transmit power difference required to the mobile terminals within a satellite beam is smaller than the one in the terrestrial system. Therefore, in the satellite communication, even though the closed loop power control is performed by a downlink control channel corresponding to each packet channel, power efficiency is not enhanced. Accordingly, if downlink dedicated control channels are assigned to the terrestrial system, it leads to unnecessary channel assignment and power loss and causes the problem of spreading code limitation.

Fourth, in the terrestrial system, the propagation delay between a base station and a mobile terminal is short and thus fast power control can be used for each mobile terminal. The power control is performed every slot in the downlink dedicated control channel. Meanwhile, in the satellite system, such fast power control is impossible due to the longer propagation delay in the satellite link.

DISCLOSURE OF INVENTION

It is, therefore, an object of the present invention to provide a method and apparatus for common packet channel access that can reduce the access delay spent in a mobile satellite communication system.

It is another object of the present invention to provide a method and apparatus for common packet channel access that can improve the probability of a satellite access network receiving preambles transmitted from a mobile terminal in a mobile satellite communication system.

It is still another object of the present invention to provide a method and apparatus for the common packet channel access that can control a plurality of common packet channels using a common control channel in a mobile satellite communication system.

It is still another object of the present invention to provide a method and apparatus for common packet channel access that can control the transmit power of a common packet channel using a slot in the frame of the common control channel.

In accordance with one aspect of the present invention, there is provided a method for accessing a common packet channel shared by a plurality of mobile terminals to transmit data packets in a mobile satellite communication system, comprising the steps of: a) receiving an access preamble generated based on an access signature, and a collision-detection preamble generated based on a collision-detection signature, which are transmitted together from the mobile terminals; and b) transmitting an acknowledgement to the access preamble and the collision-detection preamble to the mobile terminals through a preamble acknowledgement channel.

In accordance with another aspect of the present invention, there is provided a method for accessing a common packet channel shared by a plurality of mobile terminals in a mobile satellite communication system, comprising the steps of: a) transmitting an access preamble and a collision-detection preamble successively to a satellite access network; b) receiving an acknowledgement to the access preamble and the collision-detection preamble from a satellite access network through a preamble acknowledgement channel; and c) retransmitting the access preamble and the collision-detection preamble, or transmitting a data packet through the common packet channel, according to the acknowledgement.

In accordance with further another aspect of the present invention, there is provided an apparatus for accessing a common packet channel which is shared by a plurality of mobile terminals to transmit data packet in a mobile satellite communication system, comprising: a channel determining unit for determining if there is a common packet channel available or a common packet channel group available according to common packet channel information broadcasted from a satellite access network, and selecting one of channels or groups available; a transmission resource determining unit for selecting an access frame for transmitting an access preamble having a plurality of sub-access preambles and a collision-detection preamble, a sub-access frame in the access frame, a transmission offset time, an access signature code for generating the access preamble, a collision-detection signature code for generating the collision-detection preamble, and a spreading code corresponding to the selected sub-access frame; a generation unit for generating the access preamble and the collision-detection preamble based on the access signature code, the collision-detection signature code and the spreading code; a transmission unit for transmitting the access preamble and the collision-detection preamble successively, after the selected transmission offset time is passed from a starting point of the access frame or the sub-access frame; a reception unit for receiving an acknowledgement to the access preamble and the collision-detection preamble from the satellite access network; and a transmission determining unit for determining whether to transmit the access preamble and the collision-detection preamble, or to transmit data packet through the common packet channel, according to the acknowledgement.

In accordance with still another aspect of the present invention, there is provided an apparatus for accessing a common packet channel shared by a plurality of mobile terminals to transmit data packet, comprising: a reception unit for receiving an access preamble including an access signature code and a collision-detection preamble including a collision-detection signature code, which are transmitted together from the mobile terminal; an acknowledgement generating unit for generating any one among a positive acknowledgement allowing the mobile terminal to access the common packet channel, a disagreement acknowledgement allowing another mobile terminal to access the common packet channel, and a negative acknowledgement indicating that the common packet channel or the common packet channel group requested by the access preamble cannot be used currently; and a transmission unit for transmitting the acknowledgement to mobile terminals.

According to the present invention, an access preamble and a collision-detection preamble are transmitted together at one time in order to reduce access delay in the procedure of the common packet channel access.

To enhance the probability of detecting access preambles, sub-preambles containing the same signature are transmitted repeatedly.

By using a common control channel to control packet transmission in common packet channels, the transmit power and the number of spreading codes required for the control channel are reduced.

Further, it becomes possible to perform closed loop power control on the common packet channel by using a slot in the radio frame of the common control channel.

BRIEF DESCRIPTION OF DRAWINGS

The above and other objects and features of the present invention will become apparent from the following description of the preferred embodiments given in conjunction with the accompanying drawings, in which:

FIGS. 7A and 7B are flow charts showing the method for common packet channel access in accordance with the preferred embodiment of the present invention.

BEST MODE FOR CARRYING OUT THE INVENTION

Other objects and aspects of the invention will become apparent from the following description of the embodiments with reference to the accompanying drawings, which is set forth hereinafter. The same reference number is given to the same element in different drawings. Also, in case where detailed description on the related art blurs the point of the present invention, the description will be omitted.

Figure 1:
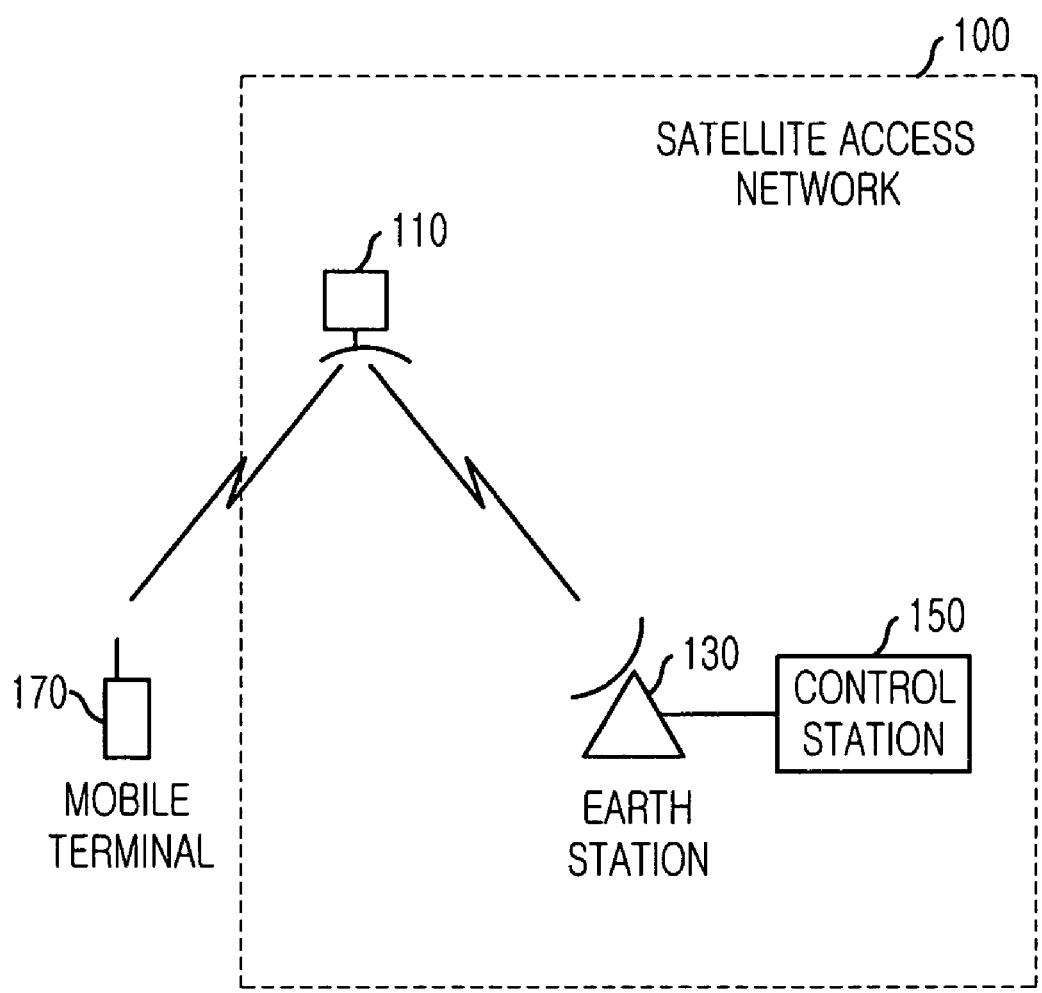
FIG. 1 is a schematic diagram illustrating the mobile satellite communication environment of a satellite access network and a mobile terminal in accordance with the present invention.

FIG. 1 is a schematic diagram illustrating the mobile satellite communication environment of a satellite access network and a mobile terminal in accordance with the present invention. As shown in the drawing, the mobile satellite communication environment of the present invention comprises a mobile terminal 170 which generates user data, and transmits preambles and user data through a common packet channel, and a satellite access network 100 which determines whether to allow common packet channel access based on the preamble received from the mobile terminal 170, and relays the user data to the terrestrial network (not shown). The satellite access network 100 includes a control station 150 which controls the satellite access network 100 and performs internetworking with the terrestrial network, a satellite 110, and an earth station 130, thereby providing a connection between the mobile terminal 170 and the terrestrial network (not shown).

Figure 2:
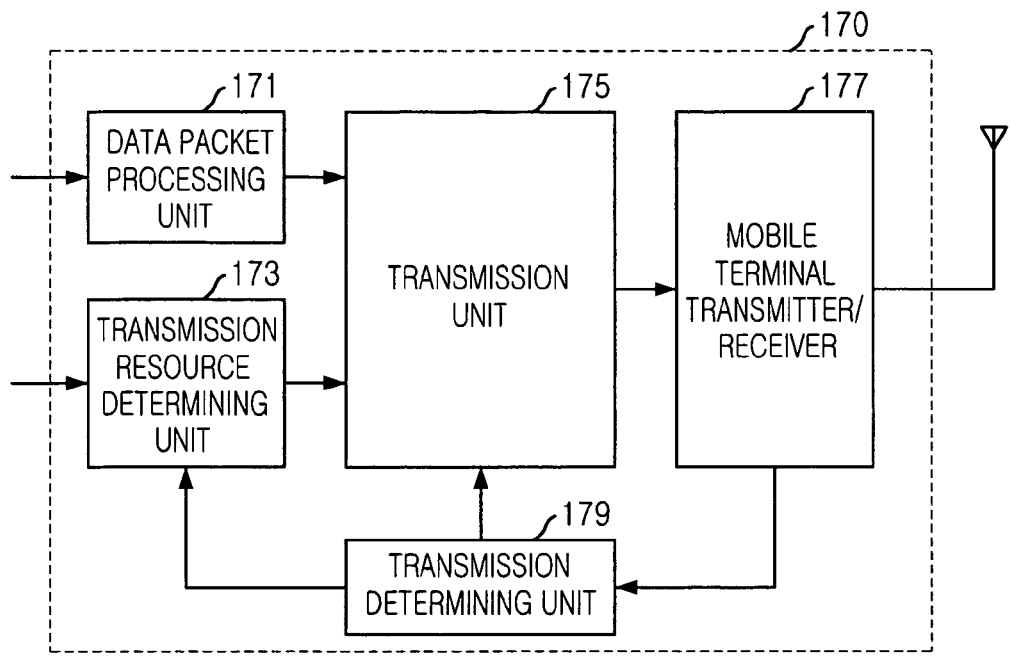
FIG. 2 is a block diagram describing the functional structure of the mobile terminal of FIG. 1 in accordance with an embodiment of the present invention.

FIG. 2 is a block diagram describing the functional structure of the mobile terminal of FIG. 1 in accordance with an embodiment of the present invention. As shown in the drawing, the mobile terminal 170 of the present invention transmits an access preamble and a collision-detection preamble to the satellite access network 100 successively in an access frame, and it includes a mobile terminal transmitter/receiver 177 which receives an acknowledgement of the access preamble and the collision-detection preamble from the satellite access network 100.

In accordance with the present invention, the mobile terminal transmitter/receiver 177 receives a common packet channel control command that is broadcasted by the satellite access network 100 through a downlink common control channel. The mobile terminal transmitter/receiver 177, as will be described later, can transmit the access preamble and the collision-detection preamble with a predetermined transmission offset time $T_0$ from the staring point of an access frame.

Also, the mobile terminal 170 includes a data packet processing unit 171 that converts user data into data packets that can be transmitted through the common packet channel.

In addition, the mobile terminal 170 further includes a transmission resource determining unit 173 which selects an access frame for transmitting the access preamble and the collision-detection preamble, an access signature code for generating the access preamble, and a collision-detection signature code for generating the collision-detection preamble. The transmission resource determining unit 173 of each mobile terminal that desires to access the common packet channel can select the access frame independently, and the access frame can be set larger than the maximum difference of round trip delays for mobile terminals in a satellite beam. In the mean time, the transmission resource determining unit 173 performs data transmission control and transmit power control based on the common packet channel control command received from the satellite access network 100.

The mobile terminal 170, also, generates an access preamble and a collision-detection preamble using the access signature code and collision-detection signature code, respectively. The mobile terminal 170 includes a transmission unit 175 that receives the data packet from the data packet processing unit 171 and converts the data packet into a signal that is suitable for the common packet channel. Accordingly, the transmission unit 175 has a preamble generating unit and a data packet generating unit (not shown).

Finally, the mobile terminal 170 includes a transmission determining unit 179 that determines whether to retransmit the access preamble and the collision-detection preamble or to transmit the data packet through the common packet channel, based on the acknowledgement that the mobile terminal transmitter/receiver 177 has received from the satellite access network 100. The transmission determining unit 179 includes a channel determining unit (not shown) which determines if there are common packet channels available (in case of a channel unassignment mode) or common packet channel groups available (in case of a channel assignment mode), and selects a common packet channel or a common packet channel group. The transmission determining unit 179, in case that there is no acknowledgement received from the satellite access network 100, activates the transmission resource determining unit 173 and the transmission unit 175 to increase power and retransmit the access preamble and the collision-detection preamble until it receives any acknowledgement. Also, the transmission determining unit 179 activates the transmission resource determining unit 173 and the transmission unit 175 to retransmit the access preamble and the collision-detection preamble after a predetermined time, in case where either disagreement acknowledgement or negative acknowledgement is received from the satellite access network 100, which will be described later on. The transmission determining unit 179, also, activates the transmission unit 175 to transmit a data packet through a common packet channel (in case of channel unassignment mode) which is selected when the acknowledgement from the satellite access network 100 is a positive acknowledgement, which will be described later, or a common packet channel (in case of channel assignment mode) assigned by the positive acknowledgement.

The channel determining unit in the transmission determining unit 170 determines if there are available common packet channels or available common packet channel groups based on the channel information obtained from the satellite access network 100 through a channel status broadcasting channel, and updates parameters related to common packet channel access based on the channel information obtained through the channel status broadcasting channel.

Figure 3:
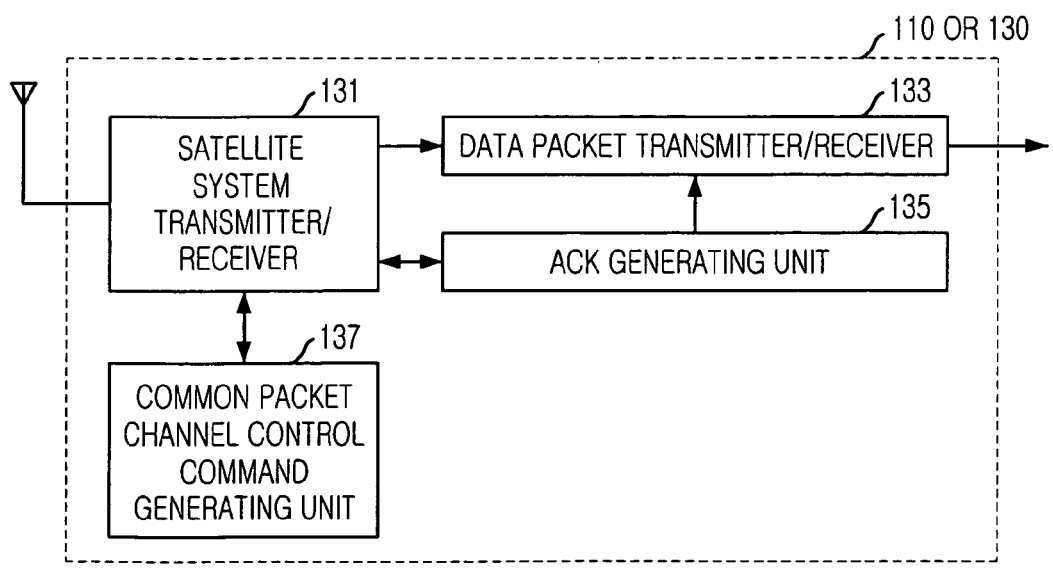
FIG. 3 is a block diagram depicting the structure of a common packet channel access apparatus employed in either an earth station or a satellite of FIG. 1 in accordance with the embodiment of the present invention.

FIG. 3 is a block diagram depicting the structure of a common packet channel access apparatus employed in the earth station or satellite of FIG. 1 in accordance with the embodiment of the present invention.

The common packet channel access apparatus of the present invention can be embodied in either the satellite 110 or the earth station 130. As illustrated in the drawing, the common packet channel access apparatus comprises a satellite system transmitter/receiver 131 for receiving an access preamble, a collision-detection preamble, and a data packet received from a plurality of mobile terminals, and transmitting acknowledgements to the mobile terminals, and a data packet transmitter/receiver 131 for relaying the data packet to the terrestrial network.

Meanwhile, the common packet channel access apparatus further comprises an acknowledgement generating unit 135 for generating an acknowledgement to an access preamble and an collision-detection preamble received from the satellite system transmitter/receiver 131 in accordance with the present invention, and a common packet channel control command generating unit 137 for generating a control command with respect to the common packet channel, which will be transmitted through a downlink common control channel.

In accordance with the present invention, there are a plurality of preamble transmission channels 405 and common packet channels 407 for the uplink (reverse link), which is from the mobile terminal 170 to the satellite access network 100, and there are a channel status broadcasting channel, a preamble acknowledgement channel 403, and a common control channel 401 for the downlink (forward link), which is from the satellite access network 100 to the mobile terminal 170.

The channel status broadcasting channel is for the satellite access network 100 transmitting information on the current status of the common packet channel, whether it is used or not, to the mobile terminal 170. The mobile terminal 170 checks out the status of the common packet channel 407, by receiving information from the satellite access network 100 through a channel status broadcasting channel, and then transmits an access preamble 415 and a collision-detection preamble 425 to the satellite access network 100 through the preamble transmission channel 405 in order to access the common packet channel 407.

The preamble transmission channel 405 is for transmitting an access preamble 415 and a collision-detection preamble 425 before the data packet is transmitted. Depending on the channel definition in a system, there are a plurality of preamble transmission channels, and each preamble transmission channel is distinguished by the spreading code used therefor.

After the satellite access network 100 receives the access preamble 415 and the collision-detection preamble 425, and then, transmits information 413 and 423 on whether preambles are successfully received and whether to allow data packet transmission to the mobile terminal 170, through the preamble acknowledgement channel 403.

Accordingly, if the mobile terminal 170 is allowed to transmit the data packet, it can transmit the data packet to the satellite access network 100 through the allowed common packet channel 407. Consequently, the satellite access network 100 can control the data packet transmission through the common control channel.

Figure 4:
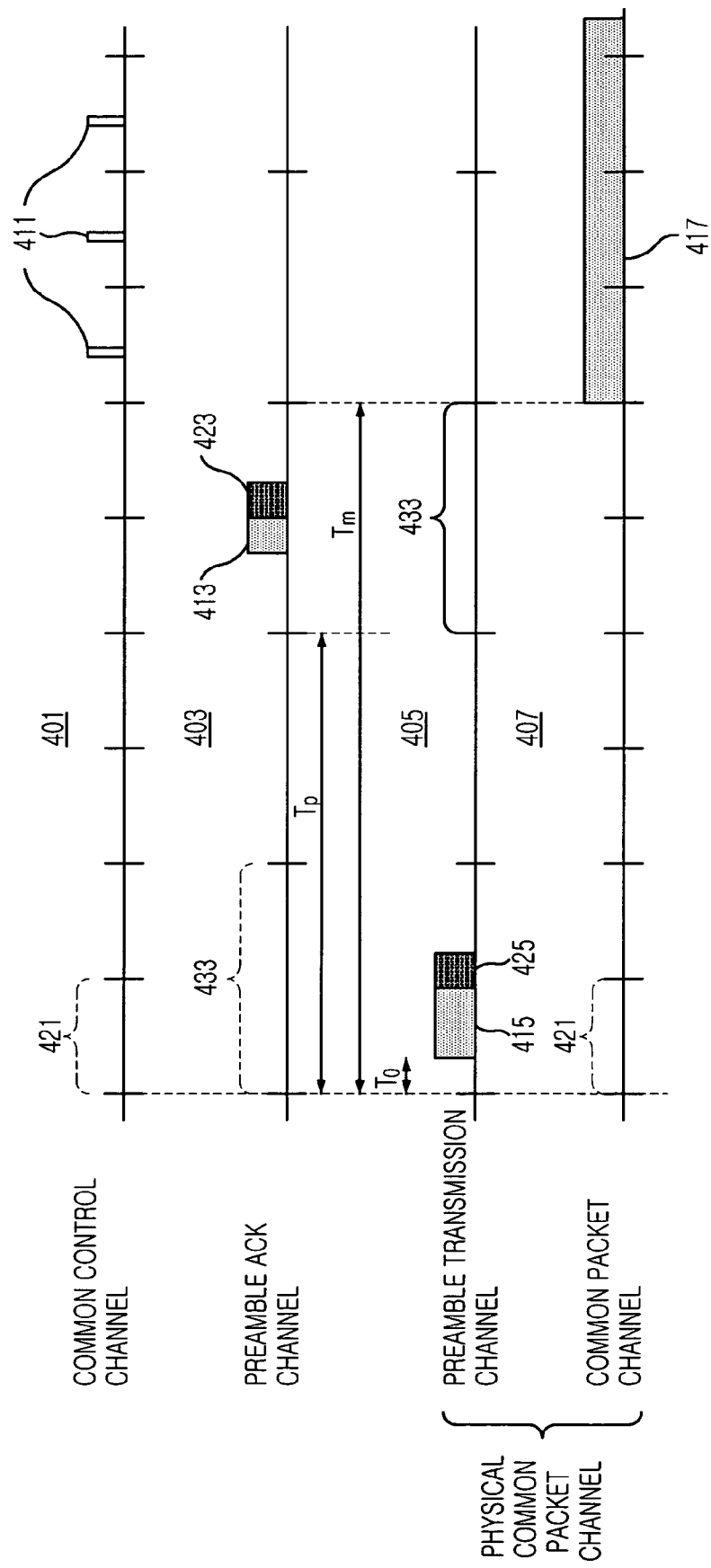
FIG. 4 is a timing diagram of frames and packets describing a method for common packet channel access in accordance with a preferred embodiment of the present invention.

FIG. 4 is a timing diagram of frames and packets describing a method for common packet channel access in accordance with a preferred embodiment of the present invention.

The preamble transmission channel 405 and the common packet channel 407 which appear throughout this specification as well as in FIG. 4, are mapped to a physical common packet channel (PCPCH), which is a physical channel. The transmission of the access preamble 415 and collision-detection preamble 425 is distinguished from the transmission of the data packet 417 by different spreading codes.

The same spreading code can be used for all of the access and collision-detection preambles 415 and 425 and the data packet 417 in order to reduce the system complexity. However, this may lead to high collision risk among packets transmitted by mobile terminals. Since it is obvious to those skilled in the art of the invention that whether or not the same spreading code is to be used wholly depends on the choice of a system designer, it should be understood that this invention is not limited to the case that the preamble transmission channel 405 and the common packet channel 407 are distinguished by the selection of spreading codes.

The mobile terminal 170 within the satellite coverage acquires timing of the radio frame 421 and the access frame 433 by receiving the common control channel 401. The reception time becomes a timing basis for the preamble acknowledgement channel 403, the preamble transmission channel 405, and the common packet channel 407.

Here, in FIG. 4, which describes a preferred embodiment of the present invention, the common control channel 401 and the common packet channel 407 include radio frames 421 of the same length. The preamble acknowledgement channel 403 and the preamble transmission channel 405 include access frames 433 having a length twice as long as the radio frame 421.

The length of the access frame 433 is set larger than the maximum difference between round trip delays in a satellite beam.

The mobile terminals 170 determine the start time of the access frame 433 based on the radio frame 421 of the common control channel 401. Therefore, although the mobile terminals 170 receive the same radio frame 421, reception time difference exists due to the different distance between the satellite 110 and the mobile terminals 170. Moreover, although the mobile terminals 170 transmit the preambles 415 and 425 to the satellite 110 using the same access frame 433, there is a difference on the reception time at the satellite access network 100 due to the different distance.

Therefore, the access frame 433 should be set longer than the maximum difference between round trip delays so that the satellite access network 100 knows which the access frame 433 is used for the preambles 415 and 425 by the mobile terminal 170.

However, it is obvious to those skilled in the art of the present invention that the radio frame 421 and the access frame 433, as shown in the drawing, may be selected variously according to the mobile satellite communication environment and system. Therefore, it should be understood that this invention is not limited to the selection of the radio frame 421 and the access frame 433 illustrated in the drawing.

The mobile terminal 170 receives the channel status broadcasting channel transmitted by the satellite access network 100, and checks if there is a common packet channel available (in case of a channel unassignment mode) or a common packet channel group available (in case of the channel assignment mode), prior to the transmission of the preambles 415 and 425 to access the common packet channel 407.

As described above, the channel status broadcasting channel is used for the satellite access network 100 transmitting information on the current status of the common packet channel, i.e., whether it is used or not, to the mobile terminal 170.

In case of the channel unassignment mode, the mobile terminal 170 selects a common packet channel 407 among ones available.

In case of the channel assignment mode, the mobile terminal 170 selects a packet channel group among ones available. If the mobile terminal 170 successfully obtains the grant of the common packet channel access, the satellite access network 100 assigns one packet channel 407 in the packet channel group selected.

Figure 5A:
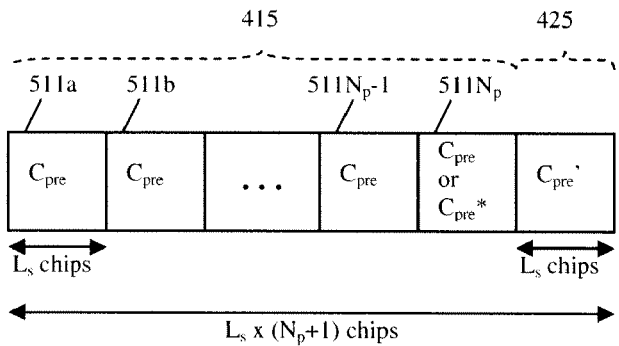
FIG. 5a is a timing diagram of access/collision detecting preamble describing a method for common packet channel access, in the case that the collision-detection preamble includes a single sub-request preamble, in accordance with a preferred embodiment of the present invention.
Figure 5B:
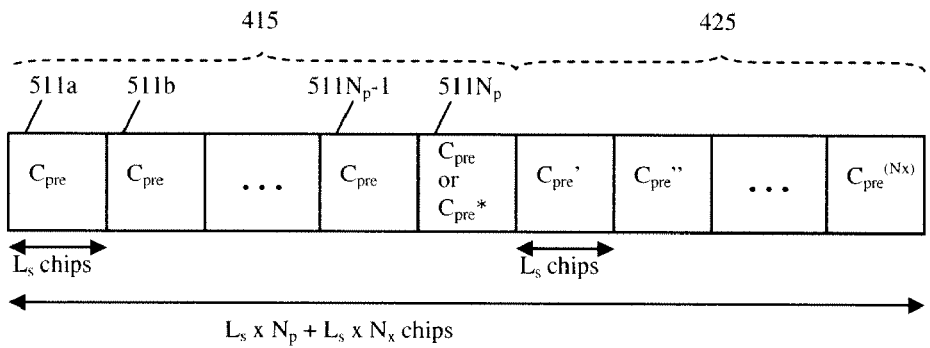
FIG. 5b is a timing diagram of access/collision detecting preamble describing a method for common packet channel access, in the case that the collision-detection preamble includes two or more ($N_x$) sub-request preambles, in accordance with a preferred embodiment of the present invention.

FIG. 5 is a timing diagram of access/collision-detection preamble describing a method for common packet channel access in accordance with the preferred embodiment of the present invention.

The mobile terminal 170 transmits the access preamble 415 and the collision-detection preamble 425 through the preamble transmission channel 405 as shown in FIGS. 4 and 5. Each mobile terminal 170 determines the starting point of the access frame 433 based on the radio frame 421 of the common control channel 401, and transmits the preambles 415 and 425 at the selected access frame 433.

In the preferred embodiment, the length of the preambles 415 and 425 is shorter than that of the access frame 433. However, it is obvious to those skilled in the art of this invention that the length of the preambles 415 and 425 can be varied depending on the mobile satellite communication environment and system. Therefore, it should be understood that this invention is not limited to the length of the preambles 415 and 425 illustrated in the drawing.

Meanwhile, the preambles 415 and 425 are transmitted with a transmission offset time $T_0$ from the starting point of the selected access frame 433. Here, $T_0$ is randomly selected in the time range of $-T_{0,MAX}$ to $T_{0,MAX}$ given by a predetermined maximum transmission offset $T_{0,MAX}$.

The transmission offset time needs for the following reason. When mobile terminals 170 located closely to each other transmit the preambles 415 and 425 in the same access frame 433, the satellite access network 100 receives the preambles 415 and 425 almost at the same time, and thus they affect to each other as interference. When the preambles 415 and 425 transmitted from a plurality of mobile terminals in the same access frame 433 are received by the satellite access network 100, they concentrate on a particular time period, and the concentrated time period depends on the difference between round trip delays. In case where the delay difference is much shorter than the time length of the access frame 433, the preambles 413 and 425 are received concentrating on a corresponding time period, causing serious interference.

Therefore, if additional time difference is artificially generated by an arbitrary transmission offset time $T_0$, this makes the overlapped time period larger, thereby reducing the interference due to the overlapped reception.

Another embodiment of the present invention, although it is not shown in the drawing, spreads the reception time of the preambles in the satellite access network 100. When the length of the access frame 433 is longer than that of the radio frame 421, one access frame 433 is divided into a plurality of sub-access frames. The mobile terminal 170 selects one of the sub-access frames and transmits the preambles 415 and 425. In other words, to send the preambles 415 and 425, the mobile terminal 170 selects an access frame 433, selects one among sub-access frames within the selected access frame 433 again. The mobile terminal 170, then, begins to transmit the preambles 415 and 425 at the starting point of the selected sub-access frame.

In this case, a spreading code $S_{Pre}$ can be selected to distinguish the preamble transmission channel and the sub-access frame, and accordingly, the preambles transmitted in the same access frame 433 but different sub-access frame can be distinguished in the satellite access network 100.

Referring to FIG. 5, the access preamble 415 is composed of $N_P-1$ sub-preambles $511a$ to $511N_P-1$ all of which have the identical spreading code $C_{Pre}$ to enhance the detection probability at the satellite access network 100, and the last sub-preamble $511N_P$ that has an inverse code $-C_{Pre}$ of the previous sub-preamble $C_{Pre}$ to notify the termination of the access preamble 415.

Each of the sub-preambles $511a$ to $511N_P$ includes a specific signature code $C_S$. Based on the signature code, the satellite access network 100 distinguishes the access preamble of a desired mobile terminal from access preambles of other mobile terminals.

When the access preamble is transmitted, each mobile terminal 170 selects and transmits one signature code that corresponds to a desired packet channel (in case of a channel unassignment mode) or a packet channel group (in case of a channel assignment mode), among signature codes available. A sub-preamble $C_{Pre}$ is expressed as Equation 1.

$$C_{Pre} = S_{Pre,i} \times C_S \qquad \text{Eq. (1)}$$

, where $S_{Pre,i}$ is a spreading code for a preamble transmission channel i, and $C_S$ is a signature code.

As described above, in case where an access frame 433 is divided into a plurality of sub-access frames, the mobile terminal 170 selects one sub-access frame and transmits the preambles 415 and 425 in the selected sub-access frame, and the $S_{Pre,i}$ is a spreading code for the preamble transmission channel and the selected sub-access frame i.

Signature is a sequence consisting of a plurality of symbols and there is orthogonality among different signatures. Therefore, the satellite access network 100 can distinguish preambles received from different mobile terminals from their signatures, if the mobile terminals uses different signatures. Generally, Hadamad sequence can be used for the signature.

As illustrated in FIG. 5, sub-preambles $511a$ to $511N_P$ are repeated $N_P$ times in an access preamble 415, and the length of each sub-preamble is $L_S$ chips. The last sub-preamble $511N_P$ of an access preamble 415 has an inverse code $-C_{Pre}$ of the previous sub-preamble code $C_{Pre}$. In case that the length of signature code $C_S$ is shorter than that of the sub-preamble, the signature code may be repeated within the sub-preamble.

Meanwhile, the last sub-preamble $511N_P$ of the access preamble 415 may have a conjugate code $C_{Pre}*$ of the previous sub-preamble $C_{Pre}$, instead of the inverse code $-C_{Pre}$ of the previous sub-preamble $C_{Pre}$. The conjugate code $C_{Pre}*$ can be obtained by conjugating the spreading code $S_{Pre,i}$.

Signature codes available are defined according to the common packet channel 407 to be used, and the mobile terminal 170 selects one among signature codes corresponding to the common packet channel 407.

For example, there may be 16 signature codes corresponding to 16 common packet channels. Also, there may be four signature groups (each group contains four signature codes) mapped to the four channels. The signature group may or may not include the same signature code as in the other group. The mapping relations between the packet channel and the signature code depends on the choice of a system designer.

It is, however, obvious to those skilled in the art that the repetition number of sub-preambles $511a$ to $511N_P$ and mapping of the signature code to the packet channel, which are illustrated in the drawing, can be changed variously according to the mobile satellite communication environment and system. Therefore, it should be understood that this invention is not limited to the repetition number and the mapping of the signature code as shown in the drawing.

The collision-detection preamble 425, which is transmitted along with the access preamble 415, is used for avoiding collision. As in the access preamble 425, the mobile terminal 170 selects a signature code for the collision-detection preamble 425. The selected signature code may or may not be different from that of the access preamble 415.

If an access preamble 415 is transmitted alone, a collision may happen in the data packet transmission on the common packet channel. When different mobile terminals 170 transmit access preambles 415 using the same signature code in the same access frame, the mobile terminal 170 may recognize the acknowledgement to another mobile terminal as one for itself, and thus it may attempt to transmit its data packet through the common packet channel 407 even though its access preamble 415 could not be received successfully by the satellite access network. This leads to collision in the common packet channel. In order to avoid such collision, the collision-detection preamble 425 is transmitted along with the access preamble 415.

In this embodiment, the collision-detection preamble 425 is transmitted once and is not repeated, unlike in the access preamble. This is because the sub-preamble has already been repeated in order to improve the detection probability at the satellite access network 100. Therefore, the collision-detection preamble 425 needs not to be repeated.

Meanwhile, the probability of packet transmission collision, which may be caused by the use of the same signature code in the access preamble 415, can be reduced by transmitting a plurality of collision-detection preambles 425 with signature codes selected independently.

In FIG. 5, as an embodiment of the present invention, the length of collision-detection preamble 425 is identical to the length of the sub-preambles 511a to 511$N_P$ in the access preamble 415, that is, Ls chips. Therefore, the preambles 415 and 425 has a length of $L_S \times (N_P+1)$ chips.

As described above, although a collision-detection preamble 425 having the same length of $L_S$ chips is illustrated in FIG. 5 to describe the preferred embodiment of the present invention, it is possible to form a plurality of collision-detection preambles 425. In this case, the collision probability can be reduced as shown in Equation 2.

$$\text{Collision Probability} = (1/\text{Number of Signature Codes})^{\text{number of required preambles}} \quad \text{Eq. (2)}$$

A preamble acknowledgement channel 403 is used for transmitting an acknowledgement to the preambles 415 and 425 received from the mobile terminals 170. It transmits an acknowledgement to each user, using a signal pattern corresponding to the signature code used in the received preamble.

The acknowledgement signal includes a pair of acknowledgements; an acknowledgement 413 to the access preamble, and an acknowledgement 423 to the collision-detection preamble. In the preamble acknowledgement channel 403, an access frame 433 is divided into a plurality of slots, and a preamble acknowledgement signal including two acknowledgements 413 and 423 is transmitted in a slot.

The mobile terminal 170 determines whether to transmit data packet based on the acknowledgement signal 413 and 423 received in the access frame 433, which is located $T_P$ time away from the starting point of the access frame 433 in which its preambles 415 and 425 are transmitted, as illustrated in FIG. 4.

Table 1 presents signature codes used in the acknowledgement signal transmitted through the preamble acknowledgement channel 403. It is assumed that the mobile terminal 170 uses signature codes, $C_{s,A}$ and $C_{s,R}$, while the satellite access network 100 uses signature codes, $D_{s,A}$ and $D_{s,R}$. The $C_{s,A}$ and $C_{s,R}$ denote signature codes used for the access preamble and the collision-detection preamble. The $D_{s,A}$ and $D_{s,R}$ denotes signature codes corresponding to $C_{s,A}$ and one corresponding to $C_{s,R}$, respectively.

TABLE 1

| Signature Code Used in Acknowledgement of Access Preamble | Signature Code Used in Acknowledgement of Collision-detection Preamble | Content of Acknowledgement |
|---|---|---|
| $D_{s,A}$ | $D_{s,R}$ | Positive Acknowledgement(Data Packet Transmission Allowance) |
| $D_{s,A}$ | $D'_{s,R}$ ($D'_{s,R} \neq D_{s,R}$) | Disagreement Acknowledgement |
| $-D_{s,A}$ | $D_{s,R}$ or $D'_{s,R}$ ($D'_{s,R} \neq D_{s,R}$) | Negative Acknowledgement |
| | Others | No Acknowledgement |

As shown in Table 1, if the satellite access network 100 successfully receives the preambles 415 and 425, it transmits acknowledgement signal through the preamble acknowledgement channel 403, using signature codes $D_{s,A}$ and $D_{s,R}$ that correspond to the signature codes of the access preamble 415 and the collision-detection preamble 425, respectively. In case of channel assignment mode, if data transmission is allowed, the acknowledgement signal 413 and 423, also, includes information indicating a specific common packet channel 407. If the mobile terminal 170 receives a positive acknowledgement, it starts to transmit data packet in the selected or assigned common packet channel 407, from the starting point of the radio frame that is located $T_m$ time (see FIG. 4) away from the starting point of the access frame 433 in which the preambles 415 and 425 are transmitted. The time $T_m$ is predetermined by the system.

Although the satellite access network 100 has received the preambles 415 and 425 successfully, if a packet channel (in case of channel assignment mode) or a packet channel group (in case of channel unassignment mode) indicated by a signature code of the access preamble 415 is used by another mobile terminal or out of service, the satellite access network 100 transmits the negative acknowledgement signal 413 having an inverse signature code ($-D_{s,A}$) in reply to the signature code of the access preamble 415, thus notifying that the requested packet channel or packet channel group is not available.

The mobile terminal 170 that has received the negative acknowledgement considers that the packet channel or the packet channel group is in use, and after waiting for a predetermined time, it tries transmitting the preambles 415 and 425 again.

In case where the mobile terminal 170 receives an acknowledgement signal 413 and 423 that has a signature code $D_{s,A}$ corresponding to the signature code of the access preamble 415, but that has a signature code ($D'_{s,R}$ or $D'_{s,R} \neq D_{s,R}$) not corresponding to the signature code of the collision-detection preamble 425 (that is, disagreement acknowledgement), it considers that the requested channel is allowed to another mobile terminal 170. After waiting for a predetermined time, it tries transmitting the preambles 415 and 425 again.

Figure 6:
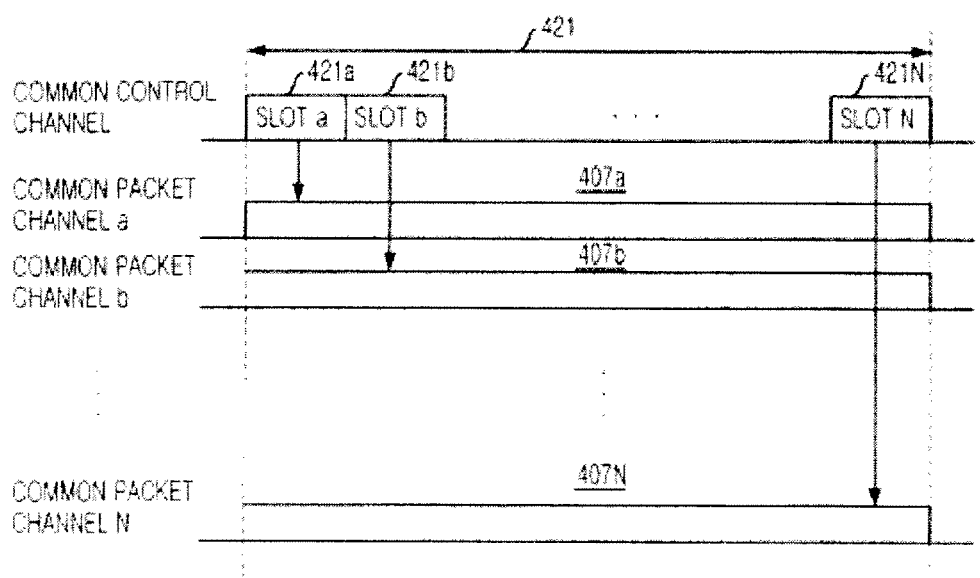
FIG. 6 is a schematic diagram describing common packet channel control in accordance with the present invention.

FIG. 6 is a schematic diagram describing common packet channel control in accordance with the present invention.

In FIG. 6, the radio frame 421 includes N slots 411a to 411N, and each of the slots 411a to 411N is associated with each of the common packet channels 407a to 407N. Therefore, it is possible to control the packet transmission in N common packet channels.

The mobile terminal 170 that is allowed to transmit data packet starts packet transmission through the selected common packet channel 407 (in case of channel unassignment mode) or the assigned channel (in case of channel assignment mode). The packet transmission in the common packet channel 407 is performed according to a pair of control commands 411, which are a power control command and a transmission control command.

Each radio frame 421 in the common control channel 401, as illustrated in FIG. 4, is divided into a plurality of slots 411a to 411N. Each of the slots 411a to 411N includes control commands, that is, a transmission control command and a power control command, for its associated packet channel 407a to 407N.

The transmission control command may indicate transmission initiation and transmission stop. The power control command is used for adjusting the transmit power of the common packet channel 407.

Accordingly, the control command on each of the packet channels 407a to 406N is periodically transmitted to the mobile terminal once a radio frame 421.

Figure 7B:
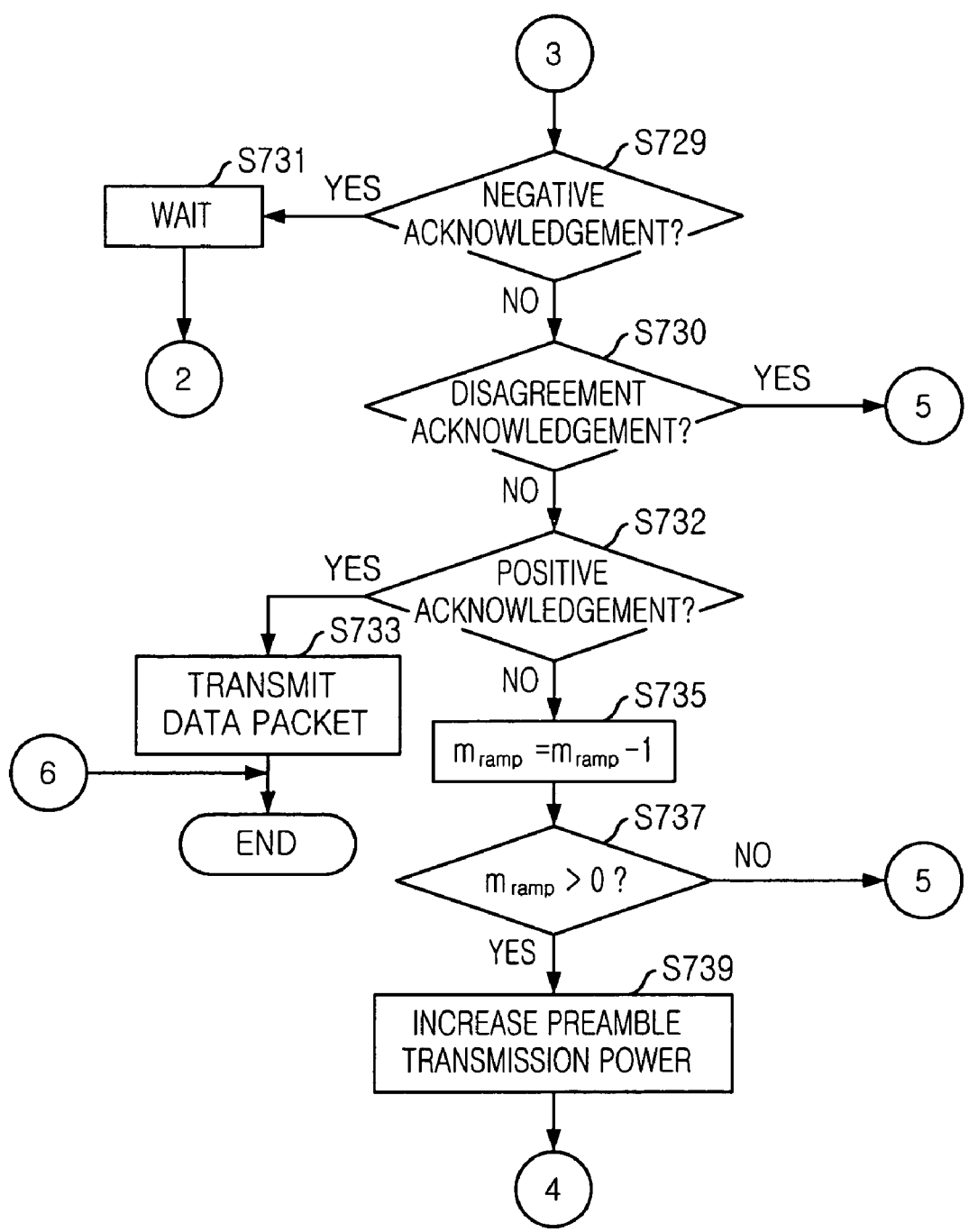

FIGS. 7A and 7B are flow charts showing the method for common packet channel access in accordance with the preferred embodiment of the present invention.

In the channel unassignment mode, the mobile terminal 170 selects a common packet channel 407 to which it desires to access, and transmits the preambles 415 and 425 using a signature that corresponds to the selected common packet channel 407. If the satellite access network 100 transmits an acknowledgement signal 413 and 423 in reply to the received preambles 415 and 425, the mobile terminal 170 transmits data packet 417 through the selected common packet channel 407.

At step S701, the mobile terminal 170 sets the retransmission number counter $m_{retx}$ as zero.

In the following access process, the retransmission can be performed at most a maximum retransmission number $M_{retx}$. At step S703, if the retransmission number counter $m_{retx}$ exceeds the maximum retransmission number $M_{retx}$ (that is, $m_{retx} > M_{retx}$), the logic flow goes to step S705 where the access process is failed.

As far as the maximum retransmission number $M_{retx}$ is not exceeded, at step S707, it is determined if there is a common packet channel available by checking the status of packet channels received through the channel status broadcasting channel.

As a result of the step S707, if all the channels are not available, at step S709, the mobile terminal waits for a predetermined time. After the predetermined time, at step S711, the mobile terminal increases the retransmission number counter $m_{retx}$ by 1, and it repeats the processes from the step S703.

As a result of the step S707, if there is a common packet channel available, at step S713, the mobile terminal updates parameters related to the access process. Table 2 presents these parameters. These parameters can be changed variously according to the mobile satellite communication environment and a system designer. Therefore, it should be understood that this invention is not limited to the set-up of the parameters related to the access process in Table 2.

TABLE 2

Spreading Code of Packet Channel
Spreading Code of Common Control Channel
Spreading Code of Channel Status Broadcasting Channel
Spreading Code of Preamble Acknowledgement Channel TABLE 2-continued Spreading Code of Preamble Transmission Channel
Available Access Frame Group for Each Packet Channel
Available Access Signature Group for Each Packet Channel
Available Request Signature Set
Slot of Common Control Channel Corresponding to Each Packet Channel
Persistence Test Probability (P)
Parameters for Computing Initial Preamble Transmission Power
Preamble Transmission Power Increase Value
Transmission Power Difference between Preamble Transmission and Data Packet Transmission
Maximum Retransmission Number ($M_{retx}$)
Maximum Preamble Retransmission Number ($M_{ramp}$)
Delay Time Range for Arbitrary Time Backoff
Predefined Backoff Delay Time
Maximum Transmission Offset Time
Preamble Acknowledgement Signal Waiting Time
Packet Transmission Waiting Time Subsequently, at step S715, a common packet channel is selected. At step S717, a persistence test is performed.

In the persistence test, a random number between 0 and 1 is generated. If the generated number is larger than the persistence test probability (P), in other words, if it does not satisfy the persistence test at step S717, it is considered that the selected channel is not available, at step S719, and the logic flow goes to the step S707 and repeats the processes.

In the persistence test, if the generated number is equal to or smaller than the persistence test probability (P), that is, if the persistence test is satisfied at step S717, a preamble retransmission number $m_{ramp}$ is initialized, at step S721.

In every retransmission number $m_{retx}$, retransmissions of the preamble can be performed at most the maximum preamble retransmission number $M_{ramp}$. FIG. 7 shows an embodiment where the preamble retransmission number $m_{ramp}$ is initialized as the maximum preamble retransmission number $M_{ramp}$ (that is, $m_{ramp} = M_{ramp}$).

Subsequently, at step S723, an access frame 433, a signature code for the access preamble 415, a signature code for the collision-detection preamble 425, and an initial transmission offset time $T_0$ (see the preamble transmission channel 405 of FIG. 4) are selected.

In accordance with another embodiment of the present invention, in case where the access frame 433 is divided into a plurality of sub-access frames, one of the sub-access frames is selected. In this case, the reference time for transmitting the preambles 415 and 425 is the starting point of the selected sub-access frame. As described above, a spreading code $S_{Pre}$ can be used for discriminating different preamble transmission channels and different sub-access frames. The spreading code is associated with the preamble transmission channel and the sub-access frame. These associated spreading codes are broadcasted to the mobile terminal 170 in the channel status broadcasting channel.

At step S725, prior to the transmission of the access preamble 415 and the collision-detection preamble 425, the mobile terminal 170 checks out the status of the selected packet channel again.

At step S725, if the selected channel is not available, the logic flow goes to the step S707 and repeats the processes.

At step S725, if the selected channel is available the access preamble 415 and the collision-detection preamble 425 are transmitted at step S727.

Subsequently, at step S729, after waiting $T_P$ time from the starting point of the access frame 433 used for transmitting the preambles 415 and 425, the mobile terminal 170 determines the access status by checking the acknowledgement signal 413 and 423 received in the preamble acknowledgement channel 403.

If the mobile terminal 170 has received a negative acknowledgement at the step 729 (in case where the selected common packet channel is already occupied by another mobile terminal, or it is out of service), it waits for a predetermined time at step S731. The mobile terminal, then, recognizes that the selected channel is not available at step S719, and goes to the step S707 to repeat the processes.

If the mobile terminal 170 receives a disagreement acknowledgement at step S732 (in case where the selected common packet channel is assigned to another mobile terminal), it waits for a predetermined time at step S709. The mobile terminal, then, increases the retransmission number counter $m_{retx}$ by 1 at step S711, and goes to the step S703 to repeat the process for a new retransmission period.

If the mobile terminal 170 receives a positive acknowledgement at step S733, it starts transmitting data packet 417 in the selected common packet channel 407 from the radio frame 433, which is $T_m$ time away from the starting point of the access frame 433 in which the last transmission of the preambles 415 and 425 is performed. The $T_m$ time is predefined by the system.

Referring to FIG. 4 again, the packet transmission in the common packet channel 407 is controlled by a pair of control commands 411: a power control command and a transmission control command.

If the mobile terminal 170 does not receive any acknowledgement signal of the positive one, the negative one or the disagreement one, it reduces the preamble retransmission number counter $m_{ramp}$ by 1 at step S735, and it determines whether the reduced preamble retransmission number counter $m_{ramp}$ is larger than zero at step S737.

If the preamble retransmission number counter $m_{ramp}$ is larger than zero, the transmit power of the preambles 415 and 425 is increased at step S739, and the logic flow goes to the step S723 to repeat the processes.

If the preamble retransmission number counter $m_{ramp}$ is equal to zero, the mobile terminal 170 waits for a predetermined time at step S709. It, then, increases the retransmission number counter $m_{retx}$ by 1 at step S711, and repeats the processes for a new retransmission period from the step S703.

Figure 8A:
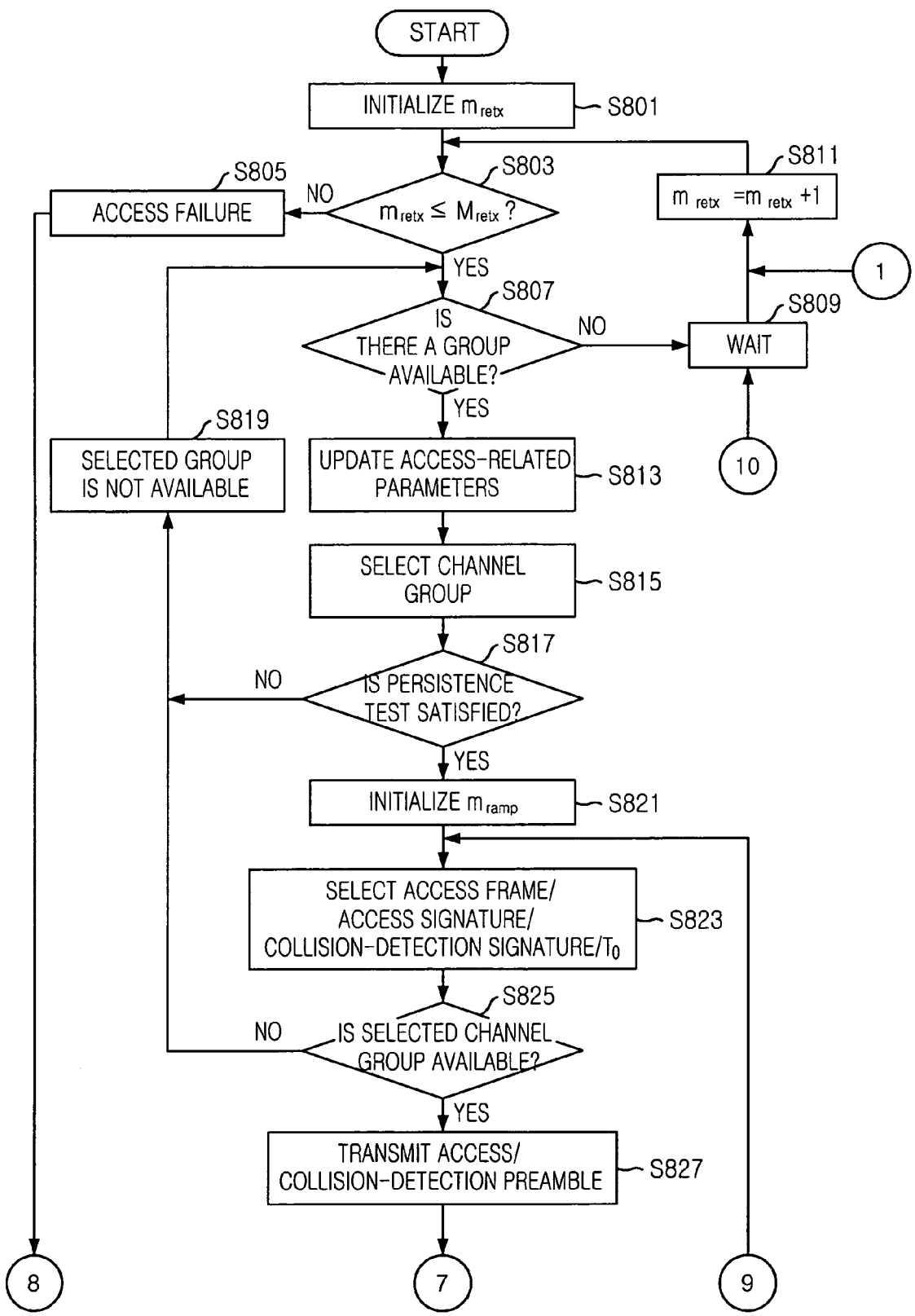
FIGS. 8A and 8B are flow charts showing the method for common packet channel access in accordance with another preferred embodiment of the present invention.
Figure 8B:
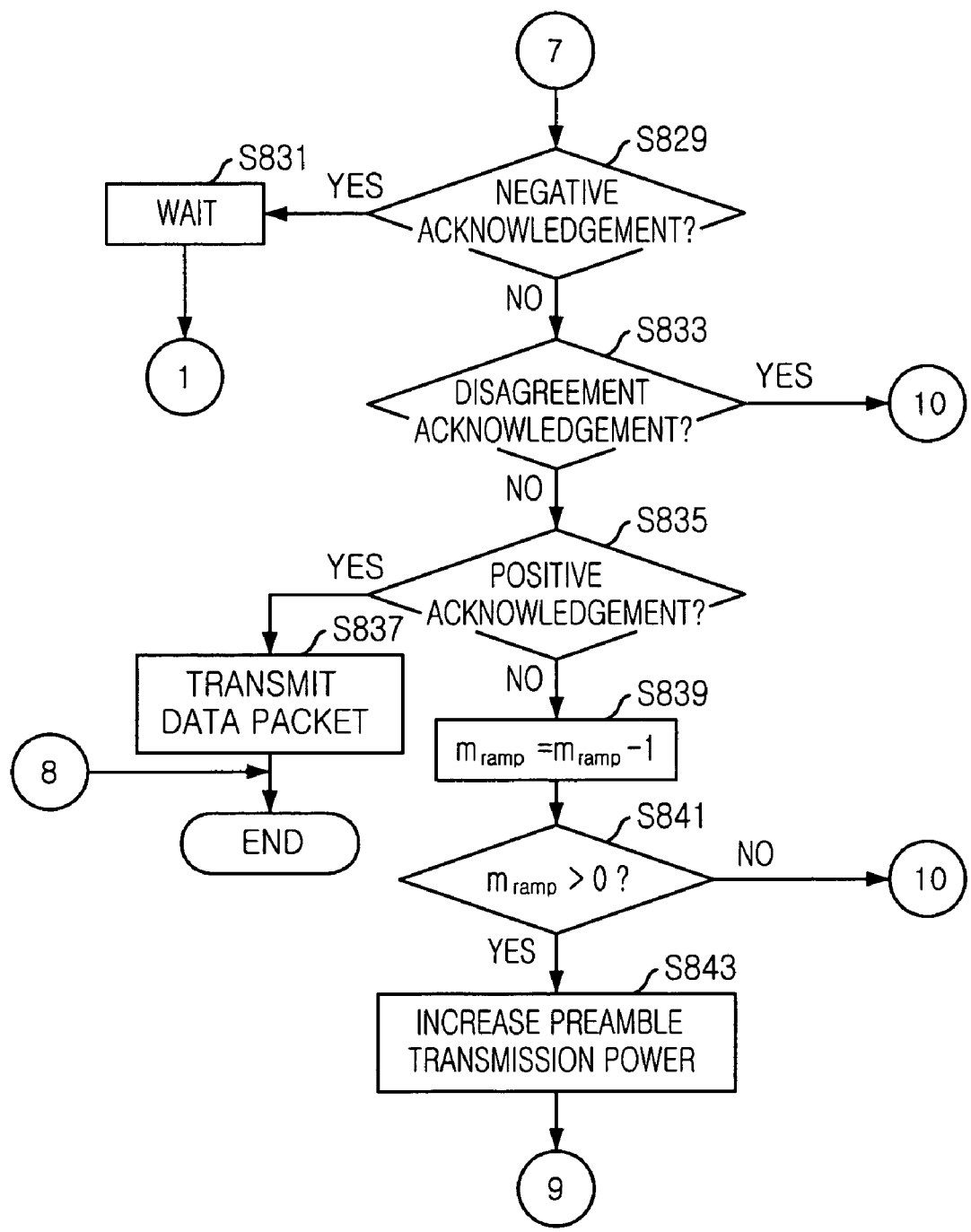

FIGS. 8A and 8B are flow charts showing the method for common packet channel access in accordance with another preferred embodiment of the present invention.

In case of channel assignment mode, the mobile terminal 170 selects a signature code corresponding to a common packet channel group, and it transmits the preambles 415 and 425 using the selected signature code.

The satellite access network 100 transmits an acknowledgement signal 413 and 423 in reply to the preambles 415 and 425, and the acknowledgement signal includes the information on which common packet channel is assigned. The mobile terminal 170 transmits data packets through the assigned common packet channel.

At step S801, the mobile terminal 170 sets the retransmission number counter $m_{retx}$ as zero.

In the following access process, the retransmission can be performed at most a maximum retransmission number $M_{retx}$. At step S803, if the retransmission number counter $m_{retx}$ exceeds the maximum retransmission number $M_{retx}$ (that is, $m_{retx} > M_{retx}$), the access process is failed at step S805.

If the maximum retransmission period counter does not exceed to the maximum retransmission number $M_{retx}$, at step S807 the mobile terminal 170 checks the status of the packet channel group which is broadcasted in the channel status broadcasting channel and it determines if there is a common packet channel group available.

In the channel assignment mode, the mobile terminal 170 does not select a specific packet channel. When the mobile terminal 170 requests for an access to a packet channel group, the satellite access network 100 assigns a channel.

As a result of the determination at the step S807, if all the channel groups are not available, the mobile terminal 170 waits for a predetermined time at step S809. The mobile terminal 170, then, increases the retransmission number counter $m_{retx}$ by 1 at step S811, and it repeats the process for a new retransmission period from the step S803.

As a result of the step S807, if there is a common packet channel group available, the mobile terminal 170 updates the parameters related to the access process at step S813. These parameters are the same as those described in Table 2 in the case of channel unassignment mode. However, these parameters can be changed depending on the mobile satellite communication environment and system design.

Subsequently, at step S815, a common packet channel group is selected. At step S817, a persistence test is performed.

In the persistence test, a random number between 0 and 1 is generated. If the generated value is larger than the persistence test probability (P), that is, if the persistence test is not satisfied, the mobile terminal 170 recognizes that the selected channel group is not available at step S819, and returns the step S807 to repeat the process.

If the generated random number in the persistence test is equal to or smaller than the persistence test probability (P), the persistence test at step S817 is satisfied. Therefore, at step S821, the preamble retransmission number counter $m_{ramp}$ is initialized.

The retransmissions of the preamble in each retransmission number $m_{retx}$ can be performed at most the maximum preamble retransmission number $M_{ramp}$. FIG. 8 shows an embodiment where the preamble retransmission number counter $m_{ramp}$ is set by the maximum preamble retransmission number counter $M_{ramp}$ (that is, $m_{ramp} = M_{ramp}$).

Subsequently, at step S823, an access frame 433 for transmitting the preambles 415 and 425, a signature code for the access preamble 415, a signature code for the collision-detection preamble 425, and an initial transmission offset time $T_0$ (see FIG. 4) are selected.

In another embodiment, where the access frame 433 is divided into a plurality of sub-access frames, one of the sub-access frames in the selected access frame is selected.

In this case, the reference time for transmitting the preambles 415 and 425 is the starting point of the selected sub-access frame. As described above, a spreading code $S_{Pre}$ can be used for discriminating different preamble transmission channels and different sub-access frames. The spreading code is associated with the preamble transmission channel and the sub-access frame. These associated spreading codes are broadcasted to the mobile terminal 170 in the channel status broadcasting channel. The signature code used for the access preamble 415 is associated with the transmission rate of the common packet channel.

Prior to the transmission of the preambles 415 and 425, at step S825, the mobile terminal 170 checks the status of the selected packet channel group again.

If the selected channel group is not available at the S825, the mobile terminal 170 recognizes that the selected channel group is not available at step S819. The mobile terminal, then, repeats the processes from the step S807.

If the selected channel group is available at the step S825, the access preamble 415 and the collision-detection preamble 425 are transmitted at step S827.

Subsequently, after waiting $T_P$ time (see FIG. 4) from the starting point of the access frame 433 used for transmitting the access preamble 415 and the collision-detection preamble 425, the mobile terminal 170 checks out for an acknowledgement signal 413 and 423 received in the preamble acknowledgement channel 403, and determines the access status, at step S829.

In case where the mobile terminal 170 receives a negative acknowledgement signal in the preamble acknowledgement channel 403, that is, if the whole packet channel group is occupied by another mobile terminal and thus there is no channel available, it waits for a predetermined time at step S831. The mobile terminal, then, increases the retransmission number counter $m_{retx}$ by 1 at step S811, and it repeats the processes for a new retransmission period from the step S803.

In case where the mobile terminal 170 receives a disagreement acknowledgement, that is, if the selected common packet channel group is assigned to another mobile terminal, it waits for a predetermined time at step S809. The mobile terminal, then, increases the retransmission number counter $m_{retx}$ by 1 at step S811, and it repeats the processes for a new retransmission period from the step S803.

In case where the mobile terminal 170 receives a positive acknowledgement, at step S837, it starts transmitting data packet 417, from the radio frame that is located $T_m$ time (see FIG. 4) away from the starting point of the access frame 433 in which the last preambles 415 and 425 are transmitted.

The transmission of data packet 417 in the packet channel 407 is controlled by a pair of control commands 411, which is a power control command and a transmission control command, as shown in FIGS. 4 and 6.

If the mobile terminal 170 does not receive any acknowledgement signal of the positive one, the negative one or the disagreement one, it decreases the preamble retransmission number counter $m_{ramp}$ by 1 at step S839, and it determines whether the reduced preamble retransmission number counter $m_{ramp}$ is larger than zero at step S841.

If the preamble retransmission number counter $m_{ramp}$ is larger than zero, the transmit power of the preambles 415 and 425 is increased and the logic flow returns to the step S823 to repeat the processes.

If the preamble retransmission number counter $m_{ramp}$ is equal to zero, the mobile terminal 170 waits for a predetermined time at step S809. The mobile terminal 170, then, increases the retransmission number counter $m_{retx}$ by 1 at step S811, and it repeats the process for a new retransmission period from the step S803.

As described above, the method of the present invention can improve the preamble detection probability at the satellite access network by using preambles suitable for mobile satellite communication system environment.

In addition, the method of the present invention can reduce transmission delay by transmitting the collision-detection preamble along with the access preamble.

The collision-avoidance capability can be improved, by transmitting a plurality of collision-detection preambles. In accordance with the present invention, the probability for collision is reduced exponentially, as a collision-detection preamble is added.

Also, the method of the present invention can reduce further transmit power and the number of used spreading codes for the downlink control channel, by using a common control channel to control the packet transmission of each mobile terminal, so as to be suitable for the mobile satellite communication environment. Further, the method of the present invention can control the transmit power of the common packet channel only with one slot in the radio frame of the common control channel, so as to be suitable for a mobile satellite communication environment.

While the present invention has been described with respect to certain preferred embodiments, it will be apparent to those skilled in the art that various changes and modifications may be made without departing from the scope of the invention as defined in the following claims.

The invention claimed is:

1. A method for accessing a common packet channel shared by a plurality of mobile terminals to transmit data packets in a mobile communication system, comprising the steps of:
   a) receiving an access preamble generated based on an access signature, and a collision-detection preamble generated based on a collision-detection signature, which are transmitted together from a mobile terminal in the plurality of mobile terminals; and
   b) transmitting an acknowledgement generated based on the access preamble and the collision-detection preamble,
   wherein the collision-detection preamble includes a sub-request preamble which is generated based on another collision-detection signature code selected by each of the mobile terminals.

2. The method as recited in claim 1, wherein transmission timings of the access preamble, the collision-detection preamble, and the acknowledgement are defined by an access frame of a predetermined length, and the access frame is selected by each mobile terminal of the plurality of mobile terminals.

3. The method as recited in claim 2, wherein the timing of the access frame is time-aligned with the timing of a radio frame received at each of the mobile terminal and the radio frame is broadcasted from an access network.

4. The method as recited in claim 2, wherein each of the access preamble and the collision-detection preamble are transmitted at a starting point of a sub-access frame which is generated by dividing the access frame selected by the mobile terminal, and a plurality of the sub-access frames have the same length.

5. The method as recited in claim 4, wherein the access preamble and the collision-detection preamble are transmitted after a transmission offset time selected by the mobile terminal is passed from the starting point of the access frame or the sub-access frame.

6. The method as recited in claim 4, wherein the access preamble and the collision-detection preamble are generated based on a spreading code associated with the selected sub-access frame.

7. The method as recited in claim 4, wherein the sub-access frame has the same time length as the radio frame broadcasted from the access network.

8. The method as recited in claim 2, wherein the access frame is larger than a maximum time difference of round trip delays in a satellite beam.

9. The method as recited in claim 1, wherein in the step b), an access acknowledgement to the access preamble and a request acknowledgement to the collision-detection preamble are transmitted together.

10. The method as recited in claim 1, wherein the access preamble includes N sub-access preambles, which is generated based on an access signature code corresponding to a common packet channel or a common packet channel group, where N is an integer larger than 2.

11. The method as recited in claim 10, wherein the access preamble includes:
N−1 number of the sub-access preambles having the same code; and
one sub-access preamble having a conjugate code for the code in the other sub-access preambles.

12. The method as recited in claim 10, wherein the access preamble includes:
N−1 number of the sub-access preambles having the same code; and
one sub-access preamble having an inverse code for the code in the other sub-access preambles.

13. The method as recited in claim 1, wherein the sub-request preamble includes two or more sub-preambles.

14. The method as recited in claim 13, wherein the collision-detection signature codes are selected independently each other.

15. The method as recited in claim 1, wherein the acknowledgement is one among:
a positive acknowledgement allowing the mobile terminal to access the common packet channel;
a disagreement acknowledgement allowing another mobile terminal to access the common packet channel; and
a negative acknowledgement indicating that the common packet channel or the common packet channel group requested by the access preamble is not available to the mobile terminal at present.

16. The method as recited in claim 15, wherein the positive acknowledgement includes:
an access acknowledgement having a signature code corresponding to the access signature code; and
a request acknowledgement having a signature code corresponding to the collision-detection signature code.

17. The method as recited in claim 15, wherein if the access signature code corresponds to the common packet channel group, the positive acknowledgement includes information on the common packet channel assigned to the mobile terminal.

18. The method as recited in claim 15, wherein the disagreement acknowledgement includes: an access acknowledgement having a signature code corresponding to the access signature code; and a request acknowledgement having a signature code that does not correspond to the collision-detection signature code.

19. The method as recited in claim 15, wherein the negative acknowledgement includes: an access acknowledgement having an inverse access signature code.

20. The method as recited in claim 1, further comprising the steps of:
c) receiving data packet transmitted from the mobile terminals that are allowed to access a common packet channel of a plurality of common packet channels; and
d) broadcasting control commands, which include a transmit power control command and a transmission control command for the packet transmission on the allowed common packet channel, through a common control channel, on a slot by slot basis,
wherein a radio frame of the common control channel includes a plurality of slots and each slot contains broadcasting control commands on each common packet channel.

21. A method for accessing a common packet channel shared by a plurality of mobile terminals in a mobile communication system, comprising the steps of:
a) transmitting an access preamble and a collision-detection preamble successively to an access network, wherein the collision-detection preamble includes a sub-request preamble which is generated based on another collision-detection signature code selected by each of the plurality of mobile terminals;
b) receiving an acknowledgement to the access preamble and the collision-detection preamble from the access network through a preamble acknowledgement channel; and
c) retransmitting the access preamble and the collision-detection preamble, or transmitting a data packet through the common packet channel, according to the acknowledgement.

22. The method as recited in claim 21, wherein transmission timings of the access preamble and the collision-detection preamble are defined by an access frame having a predetermined length, and the access frame is selected by each of the mobile terminals.

23. The method as recited in claim 22, wherein the timing of the access frame is time-aligned with a timing of a radio frame received at each of the mobile terminal and the radio frame is broadcasted from the access network.

24. The method as recited in claim 22, wherein each of the access preamble and the collision-detection preamble are transmitted at a starting point of a sub-access frame which is generated by dividing the selected access frame, and a plurality of the sub-access frames having the same length.

25. The method as recited in claim 24, wherein the access preamble and the collision-detection preamble are transmitted after a transmission offset time selected by the mobile terminal is passed from the starting point of the access frame or the sub-access frame.

26. The method as recited in claim 24, wherein the access preamble and the collision-detection preamble are generated based on a spreading code associated with the selected sub-access frame.

27. The method as recited in claim 24, wherein the sub-access frame has the same time length as the radio frame broadcasted from the access network.

28. The method as recited in claim 22, wherein the time length of the access frame is larger than the maximum difference of round trip delays in a satellite beam.

29. The method as recited in claim 21, wherein in the step b), an access acknowledgement to the access preamble and a request acknowledgement to the collision-detection preamble are received together.

30. The method as recited in claim 21, wherein the access preamble includes N number of sub-access preambles, which is generated based on an access signature code corresponding to a common packet channel or a common packet channel group, where N is an integer larger than 2.

31. The method as recited in claim 30, wherein the access preamble includes:
N−1 number of the sub-access preambles having the same code; and
one sub-access preamble having a conjugate code for the code of the other sub-access preambles.

32. The method as recited in claim 30, wherein the access preamble includes:
N−1 number of the sub-access preambles having the same code; and
one sub-access preamble having an inverse code for the code of the other sub-access preambles.

33. The method as recited in claim 21, wherein the sub-request preamble includes two or more sub-preambles.

34. The method as recited in claim 33, wherein the collision-detection signature codes are selected independently each other.

35. The method as recited in claim 34, wherein the acknowledgement is one among:
   a positive acknowledgement allowing the mobile terminal to access the common packet channel;
   a disagreement acknowledgement allowing another mobile terminal to access the common packet channel; and
   a negative acknowledgement indicating that the common packet channel or the common packet channel group requested by the access preamble is not available to the mobile terminal at present.

36. The method as recited in claim 35, wherein the positive acknowledgement includes:
   an access acknowledgement having a signature code corresponding to the access signature code; and
   a request acknowledgement having a signature code corresponding to the collision-detection signature code.

37. The method as recited in claim 35, wherein if the access signature code corresponds to the common packet channel group, the positive acknowledgement includes information on the common packet channel assigned to the mobile terminal.

38. The method as recited in claim 35, wherein the disagreement acknowledgement includes:
   an access acknowledgement having a signature code corresponding to the access signature code; and
   a request acknowledgement having a signature code that does not correspond to the collision-detection signature code.

39. The method as recited in claim 35, wherein the negative acknowledgement includes:
   an access acknowledgement having an inverse access signature code.

40. The method as recited in claim 21, wherein the step a) comprises the steps of:
   a1) selecting a common packet channel if there is a common packet channel available;
   a2) selecting an access frame for transmitting the access preamble and the collision-detection preamble, an access signature code for generating the access preamble, and a collision-detection signature for generating the collision-detection preamble; and
   a3) transmitting the access preamble and the collision-detection preamble generated based on the selected access signature code and the selected collision-detection signature code on the selected access frame.

41. The method as recited in claim 40, further comprising the step of:
   a4) determining whether a persistence test is satisfied prior to the step a3), and if the persistence test is not satisfied, repeating the step a1).

42. The method as recited in claim 40, further comprising the step of:
   a5) determining, prior to the step a3), if the selected common packet channel is not available, repeating the steps a1) to a4).

43. The method as recited in claim 40, further comprising the step of:
   a6) if there is no common packet channel available in the step a1), waiting for a predetermined time, and then repeating the steps a1) to a3) for a new retransmission number.

44. The method as recited in claim 40, wherein if none of a positive acknowledgement, a disagreement acknowledgement, and a negative acknowledgement is received from the access network in the step b), the step c) comprises the steps of:
   c1) increasing the transmit power of the access preamble and the collision-detection preamble, and repeating the steps a2) and a3), until any one of the positive acknowledgement, the disagreement acknowledgement and the negative acknowledgement is received; and
   c2) if the number of repetition times in the step c1) exceeds a predetermined maximum power-increased retransmission number, repeating the steps a1) to a3) for the new retransmission number.

45. The method as recited in claim 40, wherein if the acknowledgement obtained in the step b) is a disagreement acknowledgement, the step c) comprises the step of:
   c3) repeating the steps a1) to a3) for the new retransmission number, after a predetermined time is passed.

46. The method as recited in claim 40, wherein if the acknowledgement obtained in the step b) is a positive acknowledgement, the step c) includes the step of:
   c4) transmitting data packet through the common packet channel selected in the step a1).

47. The method as recited in claim 40, wherein if the acknowledgement obtained in the step b) is a negative acknowledgement, the step c) includes the step of:
   c5) repeating the steps a1) to a3), after a predetermined time is passed.

48. The method as recited in claim 40, wherein in the step a2), a sub-access frame is further selected among the sub-access frames, into which the access frame is divided, and the spreading code corresponds to the selected sub-access frame; and
   in the step a3), the access preamble and the collision-detection preamble are transmitted from the starting point of the access frame or the sub-access frame.

49. The method as recited in claim 48, wherein in the step b), an acknowledgement to the access preamble and the collision-detection preamble is received after a predetermined preamble-acknowledgement time is passed from the starting point of the access frame or the sub-access frame, in which the access preamble and the collision-detection preamble are transmitted in the step a3).

50. The method as recited in claim 49, wherein in the step c), the data packet is transmitted after a predetermined preamble-data time is passed from the starting point of the access frame or the sub-access frame, in which the access preamble and the collision-detection preamble are transmitted in the step a3).

51. The method as recited in claim 50, wherein the preamble-data time is longer than the preamble-acknowledgement time by one access frame length.

52. The method as recited in claim 51, wherein in the step a2), the transmission offset time is further selected, and in the step a3), the access preamble and the collision-detection preamble are transmitted after the selected transmission offset time is passed from the starting point of the access frame or the sub-access frame.

53. The method as recited in claim 40, wherein the step a1) further comprises the step of:
   a1-1) determining if there is the common packet channel based on common packet channel information broadcasted from the access network,
   and the step a2) includes the step of:
   a2-2) updating parameters related to the common packet channel access, based on the common packet channel information.

54. The method as recited in claim 40, wherein the step a) includes the steps of:
   a1) selecting a common packet channel group if there is a common packet channel group available;

a2) selecting an access frame for transmitting the access preamble and the collision-detection preamble, an access signature code for generating the access preamble, and a collision-detection signature for generating the collision-detection preamble; and a3) transmitting the access preamble and the collision-detection preamble generated based on the selected access signature code and the selected collision-detection signature code, on the selected access frame.

55. The method as recited in claim 54, wherein if the acknowledgement obtained in the step b) is a positive including information on the assignment to a common packet channel which is one in the selected common packet channel group, the step c) includes the step of:

c6) transmitting data packet through the common packet channel assigned by the positive acknowledgement.

56. The method as recited in claim 54, wherein the acknowledgement obtained in the step b) is a negative acknowledgement, the step c) includes the step of:

c7) repeating the steps a1) to a3) for the new retransmission number after a predetermined time is passed.

57. The method as recited in claim 21, further comprising the steps of:

d) transmitting data packet to the access network through the common packet channel allowed to be accessed currently;

e) receiving control commands that include a transmit power control command and a transmission control command which are broadcasted by the access network through a common control channel and included in a slot every radio frame; and f) controlling transmit power and data packet transmission according to the control commands, wherein the period of broadcasting the control commands is equal to the length of the radio frame of the common control channel.

58. An apparatus for accessing a common packet channel which is shared by a plurality of mobile terminals to transmit data packets in a mobile communication system, comprising:

a channel determining means for determining if there is a common packet channel available or a common packet channel group available according to common packet channel information broadcasted from an access network, and selecting one of channels or groups available;

a transmission resource determining means for selecting an access frame for transmitting an access preamble having a plurality of sub-access preambles and a collision-detection preamble, a sub-access frame in the access frame, a transmission offset time, an access signature code for generating the access preamble, a collision-detection signature code for generating the collision-detection preamble, and a spreading code corresponding to the selected sub-access frame;

a generation means for generating the access preamble and the collision-detection preamble based on the access signature code, the collision-detection signature code and the spreading code;

a transmission means for transmitting the access preamble and the collision-detection preamble successively, after the selected transmission offset time is passed from a starting point of the access frame or the sub-access frame;

a reception means for receiving an acknowledgement to the access preamble and the collision-detection preamble from the access network; and a transmission determining means for determining whether to transmit the access preamble and the collision-detection preamble, or to transmit a data packet through the common packet channel, according to the acknowledgement.

59. An apparatus for accessing a common packet channel shared by a plurality of mobile terminals to transmit data packets, comprising:

a reception means for receiving an access preamble including an access signature code and a collision-detection preamble including a collision-detection signature code, which are transmitted together from the mobile terminal;

an acknowledgement generating means for generating any one among a positive acknowledgement allowing the mobile terminal to access the common packet channel, a disagreement acknowledgement allowing another mobile terminal to access the common packet channel, and a negative acknowledgement indicating that a common packet channel or the common packet channel group requested by the access preamble cannot be used currently; and a transmission means for transmitting an acknowledgement generated by the acknowledgement generating means to mobile terminals.

* * * * *